United States Patent [19]
Manning

[11] Patent Number: 5,528,385
[45] Date of Patent: Jun. 18, 1996

[54] FAXMODEM WITH SCANNING CAPABILITY

[75] Inventor: Frank B. Manning, Boston, Mass.

[73] Assignee: Zoom Telephonics, Inc., Boston, Mass.

[21] Appl. No.: 494,364

[22] Filed: Jun. 26, 1995

Related U.S. Application Data

[63] Continuation of Ser. No. 134,096, Oct. 8, 1993, abandoned.

[51] Int. Cl.$^6$ ........................................................ H04N 1/32
[52] U.S. Cl. .......................... 358/468; 358/442; 379/100
[58] Field of Search ..................................... 358/468, 442, 358/440; 379/93, 96–100; 375/222; H04N 1/32

[56] References Cited

U.S. PATENT DOCUMENTS

| | | | |
|---|---|---|---|
| 4,953,199 | 8/1990 | Hoshi et al. | 379/97 |
| 4,964,154 | 10/1990 | Shimotono | 379/100 |
| 4,991,200 | 2/1991 | Lin . | |
| 4,993,062 | 2/1991 | Dula et al. | 379/98 |
| 4,996,708 | 2/1991 | Kakizawa | 379/361 |
| 5,065,427 | 11/1991 | Godbole | 379/98 |
| 5,077,786 | 12/1991 | Hashimoto | 379/97 |
| 5,115,374 | 5/1992 | Hongoh | 361/393 |
| 5,146,489 | 9/1992 | Telibasa | 379/97 |
| 5,157,519 | 10/1992 | Jacobs | 358/470 |
| 5,187,736 | 2/1993 | Moriizumi | 358/434 |
| 5,257,117 | 10/1993 | Kang et al. | 358/468 |
| 5,267,302 | 11/1993 | Kotani et al. | 379/100 |
| 5,361,296 | 11/1994 | Reyes et al. | 379/96 |
| 5,440,619 | 8/1995 | Cann | 379/100 |

OTHER PUBLICATIONS

Mamis, R. A., "The Several-in-One Fax," Inc. Magazine, vol. 15, No. 3, p. 45, Mar. 1993.
Blankenhorn, D., "Pursuing One Pheripheral," Datamation, pp. 71, 74 and 76, Oct. 15, 1988.
ANCOM Labs. Advertising Brochure for FX–Scan, consisting of 7 sheets.

*Primary Examiner*—Kim Yen Vu
*Attorney, Agent, or Firm*—Hamilton, Brook, Smith & Reynolds

[57] ABSTRACT

A modem and a method for interfacing a facsimile machine to a host computer to scan a document into the host computer and to also allow the facsimile machine and the host computer to share a common telephone line are described. The modem interfaces the host computer to both the local facsimile machine and a telephone line. When it is desired to scan a document into the host computer, the user programs the facsimile machine to dial a trigger-scanner phone number. The modem monitors the phone number dialed by the facsimile machine. The user feeds the document into the facsimile machine which converts the document to digital data and outputs it using a standard facsimile protocol. If the modem detects the trigger-scanner number, it is configured to receive and process the document data from the facsimile machine in conjunction with the host computer and its facsimile software. If the facsimile machine dials a phone number other than the trigger-scanner number to contact a remote device, it communicates with the remote device via the modem's telephone line interface.

31 Claims, 5 Drawing Sheets

FAXMODEM WITH SCANNING CAPABILITY

This application is a continuation of application Ser. No. 08/134,096 filed on Oct. 8, 1993, now abandoned, which is incorporated herein by reference in its entirety.

BACKGROUND OF THE INVENTION

Document handling is one of the important tasks performed by most computers. Documents can be created, edited, printed, stored and filed by computers via word processing and other types of applications running on the computer. In addition, computers can exchange documents via parallel and/or serial ports as well as over telephone lines via modems. A modem is an interface device coupled between a data terminal such as a computer and a telephone line. The modem permits the exchange of digital data between remote data terminals over the telephone line by providing an interface function between each terminal and the telephone network. The modem is typically plugged into a telephone jack connected to a telephone line and is positioned inside or adjacent to the associated data terminal. To support transmission of digital computer data to a remote data terminal, the modem transforms the digital data from the local data terminal into analog form necessary for telephone line transmission. On the receiving end, a second modem transforms received analog signals into digital data which is provided to its local data terminal. Faxmodems are special types of modems which permit computers to receive and transmit document data using facsimile protocols.

Oftentimes it is desirable to process a document which exists only in paper format. Such a document cannot readily be processed by the computer because it is not stored in a digital format on a medium compatible with the computer such as a floppy disk or tape. A scanner is a computer peripheral device which can read the document, convert it to a digital data format, and forward the digital data to the computer over an interface. The computer can then carry out normal document processing functions on the document as if the computer itself had created it. Facsimile machines have been used to serve the function of scanners where a computer has a faxmodem so that it can receive the facsimile data.

SUMMARY OF THE INVENTION

The present invention is directed to a modem and a method for interfacing a facsimile machine with a host computer to scan a document into the computer via the facsimile machine and to also allow the facsimile machine and computer to share a common telephone line. Like conventional faxmodems, the modem of the invention can process data using facsimile protocols such as CCITT V.17 and is therefore also referred to herein as a faxmodem. The telephone cable from the facsimile machine is connected to a facsimile interface or local instrument interface of the modem. The modem also includes a telephone line interface coupled to a telephone line over which the modem communicates with the telephone operating company's central office (CO). The facsimile interface is coupled to the line interface such that the facsimile machine can also be connected to the telephone network on the same telephone line. So in addition to scanning documents into the computer, the facsimile machine can operate normally to send and receive faxes to and from remote terminals. Processing circuitry within the modem is coupled to the facsimile interface and detects phone number digits dialed by the facsimile machine. When the processing circuitry detects that the facsimile machine has dialed a pre-programmed trigger-scanner number (TSN), it configures the modem to receive data from the facsimile machine. It should be noted that the modem can be programmed to recognize more than one TSN. To scan a document, the facsimile machine dials a trigger-scanner phone number and then reads the document to convert it to a digital format. The modem detects the TSN, receives the document data from the facsimile machine and passes the data on to the computer.

As in a typical modem, the modem of the invention can detect rings and answer telephone calls to receive data to be forwarded to the computer. In one embodiment, in a normal operating mode, the modem is configured so that the facsimile machine and the computer are connected to the telephone line. Phone number digits dialed by the facsimile machine are detected by both the modem and the telephone company central office. When a TSN is detected from the facsimile machine, the processing circuitry configures the modem to receive data from the facsimile machine and also disconnects the facsimile machine from the telephone line. The modem receives data from the facsimile machine using a standard facsimile protocol which is typically executed by the facsimile machine and faxmodem acting in conjunction with the host computer. Also in the normal operating mode, incoming calls from the central office are routed to and detected by both the facsimile machine and the ring detection circuitry of the modem. When power is removed from the modem, the facsimile machine is connected to the telephone line and receives all incoming calls.

In one embodiment, the facsimile machine and either the modem or the host computer can be programmed to answer a call after a certain number of rings depending upon the user's requirements. For example, the user may want the computer to receive all faxes when the computer is on. In that case, the modem can be programmed to answer after a fewer number of rings than the number for which the facsimile machine is programmed. If the computer is on, the modem will answer the phone. If the computer is off, the facsimile machine will receive its programmed number of rings and answer the phone. In another case, the user might want the computer to only receive faxes when the facsimile machine is out of paper or otherwise out of service. A typical facsimile machine will not answer a call when it is in such a state. If the modem is set up to answer after a greater number of rings than is the facsimile machine, when the facsimile machine is out of service, the modem will answer the phone.

In one embodiment, the modem of the invention has a datapump which processes data, facsimile and/or voice messages. The processing circuitry of the invention is configured such that the datapump processes data from the facsimile machine connected to the local phone interface as if it is coming from a remote facsimile machine over the telephone line. That is, the facsimile-scan processing circuitry of the invention is transparent to the datapump.

In one embodiment, the datapump also includes dual-tone multi-frequency (DTMF) detection circuitry for detecting phone number digits dialed by the facsimile machine. Alternatively, the DTMF detection circuitry can be separate from the datapump. The detected digits are passed from the DTMF detection circuitry to a controller which detects the phone number dialed by the facsimile machine.

The modem of the invention also typically includes current sense circuitry which senses current in the local instrument interface from the facsimile machine. This circuitry performs at least two functions. First, it senses breaks in DC current in order to detect rotary-dialed phone number digits. Current pulse detections are sent to the controller which times them to determine the phone number dialed. Second, it senses facsimile machine current in order to determine when the facsimile machine has gone off-hook. When the facsimile machine is detected as having gone off-hook, the processing circuitry configures the modem to begin monitoring phone number digits dialed by the facsimile machine.

The modem of the present invention provides numerous advantages for the user. First, the use of the modem eliminates the need for the additional scanner device. Thus, purchase and maintenance costs for the scanner device are eliminated. Also, substantial space savings may be realized.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
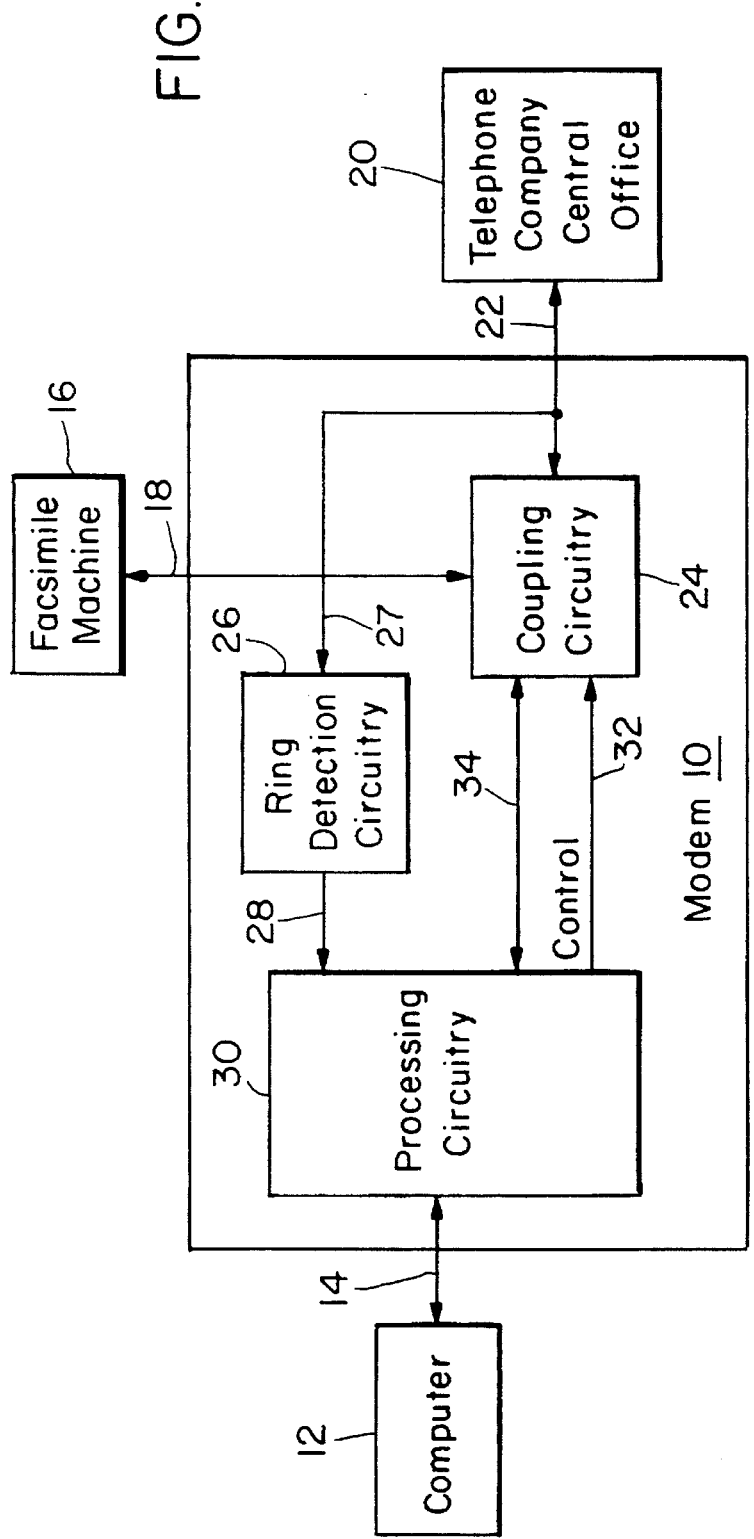
FIG. 1 is a top-level block diagram of a system including the modem of the present invention.

FIG. 1 is a top-level block diagram showing a system using the modem 10 of the present invention. The modem is interfaced to a computer 12 via a computer interface 14, to a facsimile machine 16 via facsimile or local instrument interface 18 and to the telephone operating company central office 20 via a telephone line interface 22. The facsimile machine 16 sends facsimile data to the modem 10 over the local instrument interface 18 in the same way that it communicates with a remote device when it is directly connected to a telephone line since the local instrument interface 18 appears to the facsimile machine 16 to be equivalent to a standard telephone line interface for the purpose of sending facsimile data. The line interface 22 allows the modem 10 to interface the computer 12 or facsimile machine 16 to remote devices over a phone line. In a preferred embodiment, the modem 10 can transmit and receive data in data, facsimile and voice format.

In a normal operating mode, the coupling circuitry 24 of the modem 10 connects the facsimile machine 16 to the line interface 22. The line interface 22 is also directly connected to ring detection circuitry 26 via line 27. When the modem is turned off, the facsimile machine 16 is connected to the line interface 22 so that it can perform normal facsimile functions without the intervention of the computer. In the normal operating mode, both the computer 12 and the facsimile machine 16 can place a call to a remote device via the line interface 22. Also, the modem 10 and the facsimile machine 16 simultaneously detect incoming telephone calls.

When a telephone call is received at the line interface 22, its ring is detected simultaneously by the facsimile machine 16 and the ring detection circuitry 26 of the modem 10 which forwards an indication of the ring to the processing circuitry 30 via line 28. Depending upon the programming of the facsimile machine 16 and the modem 10 acting in conjunction with the computer 12, one of the devices will answer the call. When the modem 10 answers a call, the processing circuitry 30 commands the coupling circuitry 24 via a control line 32 to route the call to the processing circuitry 30 on one of the modem data communication links indicated collectively as 34.

The facsimile machine 16 and either the modem 10 or the computer 12 can be programmed to answer the call after a specific number of rings. If either detects its predetermined number of rings, it will answer the call and begin appropriate handshaking routines to establish a communication link with the caller. The preprogrammed numbers of rings can be used to implement different options desired by the user of the system. For example, the user may want the computer to receive all faxes when it is turned on. One way to do this is to program the facsimile machine 16 to answer after M rings and the modem 10 to answer after N rings, where N is less than M. If the computer is on, the computer will answer the call and receive the fax; otherwise, the facsimile machine 16 will answer the call. Alternatively, the user may want the computer to only receive faxes when the facsimile machine 16 is out of paper or otherwise out of service and cannot or will not answer a call. To implement this option, the modem 10 and the facsimile machine 16 could be preprogrammed such that N is greater than M. In this case, the modem 10 will detect its N rings and answer the call when the facsimile machine 16 is out of service. If the facsimile machine 16 is operating properly, it will receive its M rings and answer the call. To implement these two options, the user may simply program the facsimile machine 16 to answer after a certain number of rings, for example, two rings. Then, if the first option is desired, the modem 10 should be programmed to answer on the first ring. When the second option is desired, the modem 10 should be programmed to answer on the third ring.

The processing circuitry 30 receives indications of current flowing in the interface 18 between the facsimile machine 16 and the modem 10. When the sensed current indicates that the facsimile machine 16 has gone off-hook, the processing circuitry 30 commands the coupling circuitry 24 to couple the facsimile interface 18 to the processing circuitry 30 via one of the modem communication links 34. At the same time, the facsimile machine 16 remains coupled to the central office 20 via the telephone line interface 22. Thus, when the facsimile machine 16 begins dialing a telephone number, both the processing circuitry 30 and the central office 20 detect the phone number digits.

In a preferred embodiment, the processing circuitry 30 includes a DTMF signal detection circuit for detecting phone number digits dialed by the facsimile machine 16. In addition, the processing circuitry 30 can use indications of current sensed in the facsimile interface 18 to detect rotary-dialed digits. If the processing circuitry 30 detects that the facsimile machine 16 has dialed a trigger-scanner number (TSN), then it commands the coupling circuitry 24 to couple the facsimile machine 16 to the processing circuitry 30 and the computer 12 via another of the communication links 34 and to disconnect the facsimile machine 16 from the line interface 22. The processing circuitry 30 and the computer 12 then perform the appropriate handshaking procedure to establish a link with the facsimile machine 16 as if the facsimile machine 16 had called from a remote location. Data from the facsimile machine 16 is then forwarded to the processing circuitry 30 which interacts with the computer 12 to receive the data. The approach has the advantage that the computer and facsimile software can behave the same whether a facsimile is received from a remote location or from the local facsimile machine. No modification of the computer or software is required, so the invention will work with readily available computers and facsimile software.

If the detected telephone number is not a TSN, then the call is typically completed through the telephone line interface 22 to the central office 20. The processing circuitry 30 may continue to monitor or record the call or it may command the coupling circuitry 24 to disconnect the facsimile interface 18 from the processing circuitry 30.

So to scan a document into the computer 12, the user effectively faxes the document to the computer using the local facsimile machine 16. The facsimile machine 16 first dials a TSN. When the processing circuitry 30 detects the TSN, it configures the coupling circuitry 24 such that the processing circuitry 30 can implement handshaking to establish the link. The facsimile machine 16 reads the document and transfers the digitized document data to the processing circuitry 30 using a facsimile protocol involving the processing circuitry 30 and the computer 12. The processing circuitry 30 passes received data on to the computer 12.

Figure 2D:
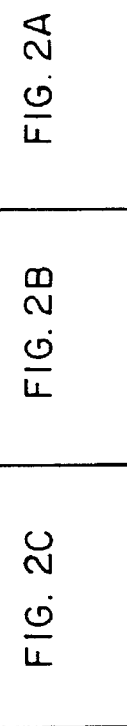
FIG. 2D shows how FIGS. 2A–2C should be connected to obtain the block diagram.
Figure 2A:
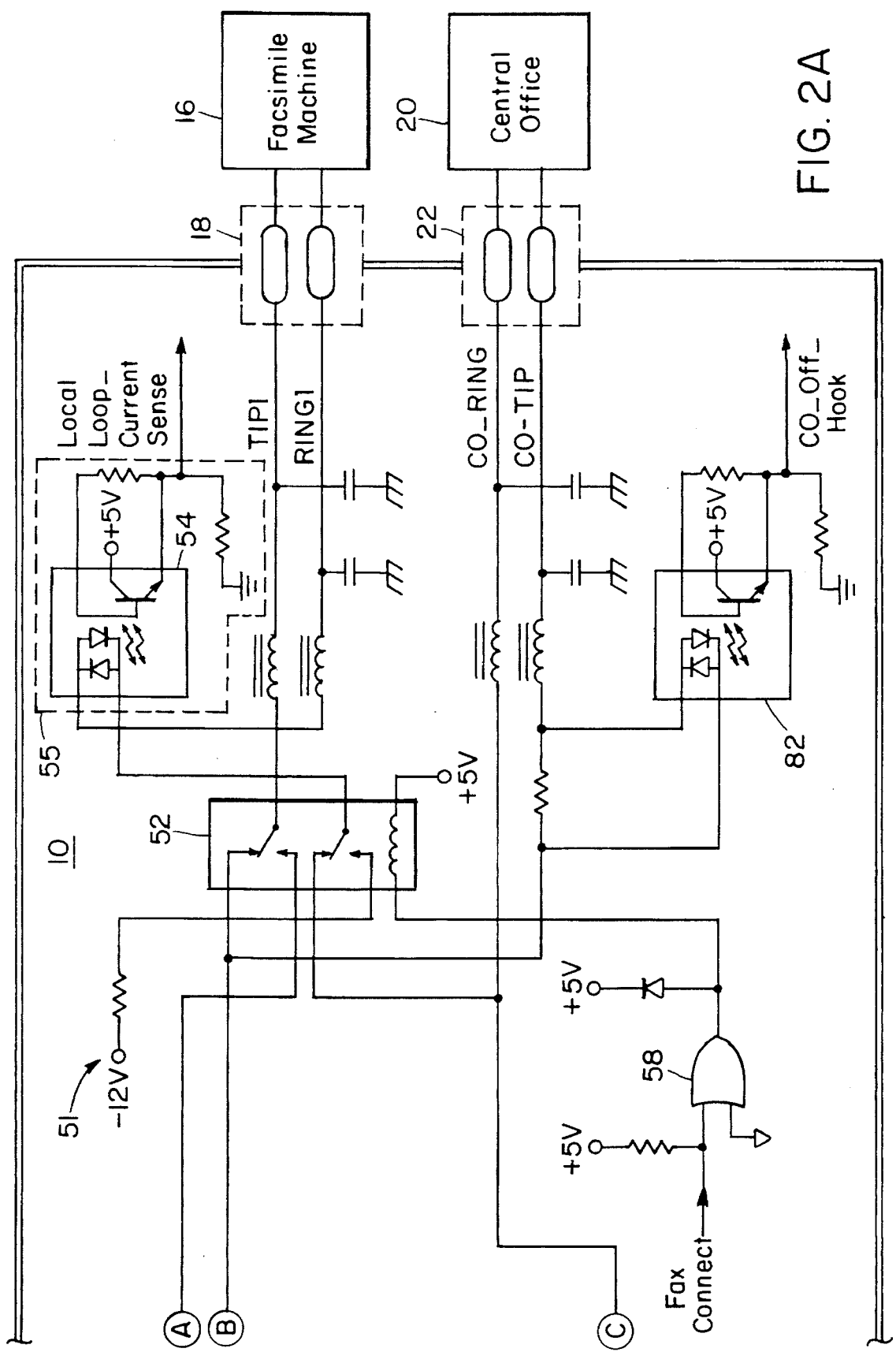
FIGS. 2A–2C contain a detailed block diagram of the modem 10 of the present invention.
Figure 2B:
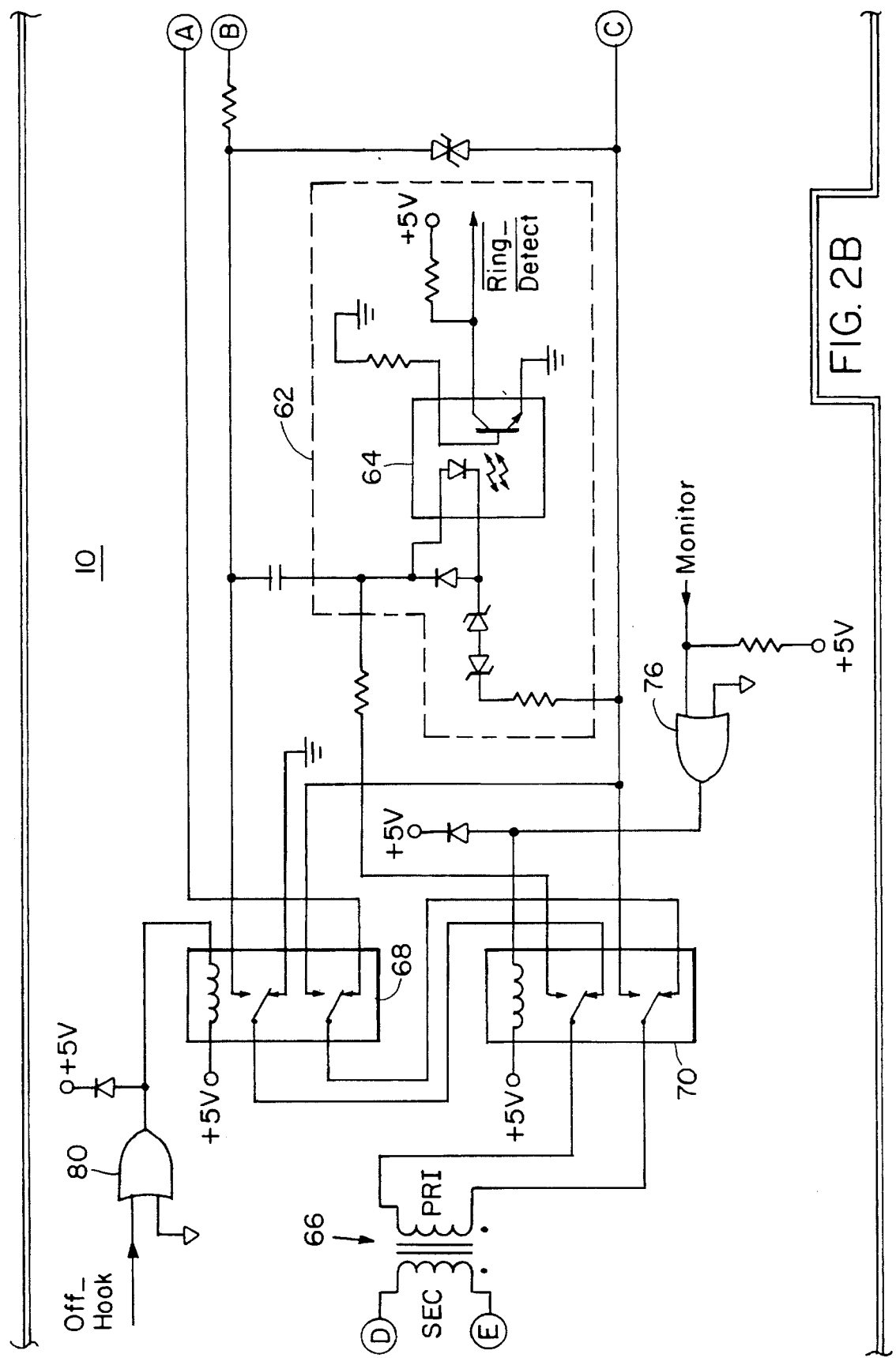
Figure 2C:
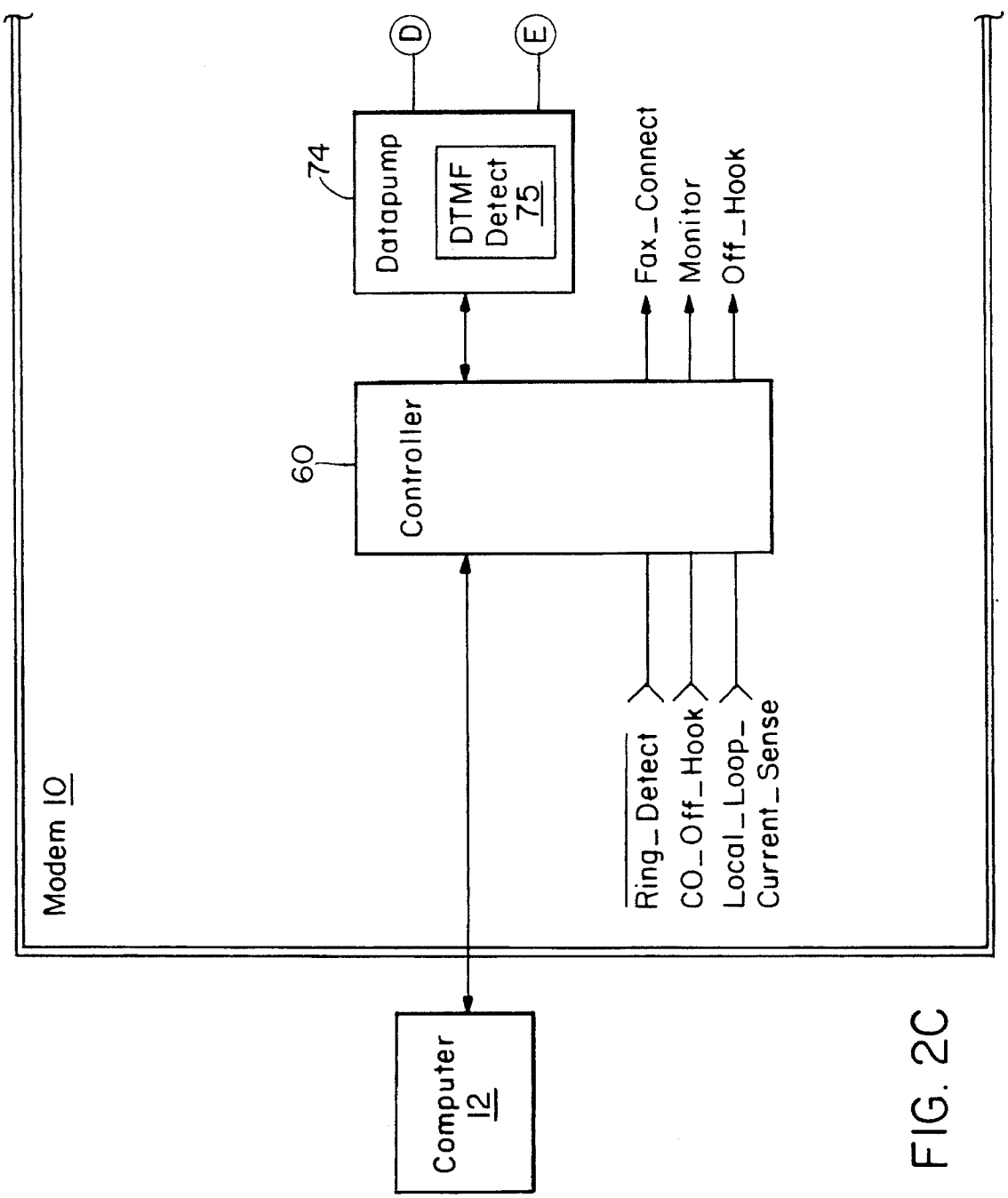

FIGS. 2A–2C contain a detailed block diagram of the modem 10 of the present invention. FIG. 2D shows how FIGS. 2A–2C should be arranged to form the complete detailed block diagram.

The facsimile machine 16 is connected to the modem 10 at the local instrument interface 18. In the normal operating mode, with relay 52 in its de-energized state as shown, the facsimile machine 16 is connected via the TIP1 and RING1 lines through the line interface 22 to the telephone operating company central office 20. Thus, incoming calls from the central office 20 will be detected by the facsimile machine 16. Also, the facsimile machine 16 can place calls to remote devices via the central office 20.

In this configuration, the tip and ring lines of the line interface 22 are connected across both the facsimile machine 16 and the ring detection circuitry 62. When an incoming call is received at the modem 10, both the facsimile machine 16 and the ring detection circuitry 62 will receive the ring signal. The optocoupler 64 and associated circuitry in the ring detection circuit 62 send a low $\overline{\text{Ring\_Detect}}$ signal to the controller 60 when the ring is received. As described in detail above, depending upon the programming of the devices, either the modem 10 or the facsimile machine 16 will answer the call.

When the facsimile machine 16 places a call, it first goes off-hook. This completes the loop between the central office 20 and the facsimile machine 16, and current begins to flow through the lines between them. The optocoupler 54 and associated circuitry in loop current sense circuit 55 sense the current and send a Local_Loop_Current_Sense signal to the controller 60. The controller examines the Local_Loop_Current_Sense signal to determine that the facsimile machine 16 is off-hook and responds by transmitting a logic low Monitor signal to OR gate 76. Relay 70 is energized to couple the facsimile machine 16 to the datapump 74 through the transformer 66. Alternatively, the controller can use the CO_Off_Hook signal from the CO current detect optocoupler 82 and its associated circuitry to detect when the facsimile machine 16 goes off-hook. However, this approach is not as reliable as using the Local_Loop_Current_Sense circuit since the CO_Off_Hook signal will become active any time current flows in the loop that includes the modem 10 and the CO 20, such as when the modem 10 is sending or receiving a call to or from a remote device via the CO 20.

In a preferred embodiment, the datapump 74 includes a DTMF detection circuit 75 which receives DTMF signals from the facsimile machine 16. In another embodiment, the DTMF detector is external to the datapump 74. The DTMF circuit 75 reports digits dialed by the facsimile machine 16 to the controller 60 which decodes the phone number dialed.

The loop current sense circuit 55 or the CO_Off_Hook current detector can also be used by the controller 60 to detect rotary-dialed telephone digits. If the facsimile machine 16 dials in rotary mode, the pulses of the digits are detected as breaks in the current from the facsimile machine 16. These pulsed current breaks are indicated to the controller 60 in the form of the Local_Loop_Current_Sense signal. The controller 60 times these indications to detect the rotary-dialed telephone number.

If the dialed phone number is a TSN, the controller 60 responds by transmitting a logic low Fax_Connect signal to OR gate 58. This energizes relay 52 to create an AC path through relays 52, 68 and 70 for facsimile signals between the facsimile machine 16 and the transformer 66. It also disconnects the facsimile machine 16 from the line interface 22 to effectively "hang up" on the telephone company. Some facsimile machines require a DC current to operate. Typically, the central office provides this DC current from a CO battery. The faxmodem of the invention includes a CO battery simulation circuit which includes a –12 VDC source 51. Energizing relay 52 also applies the –12 VDC source to the facsimile machine 16. DC current flows between the source and ground through the facsimile machine 16, relays 52, 68 and 70 and the primary of transformer 66. At the same time relay 52 is energized, the controller 60 sends a logic high Monitor signal to OR gate 76 to de-energize relay 70.

The controller 60 now sends information to the computer 12 so that the computer will process the incoming information as if a remote facsimile machine had called. Most commonly, the controller 60 sends a sequence of RING messages to the computer 12 as if an incoming ring was occurring. The computer 12, executing facsimile software, waits for a pre-programmed number of rings and then instructs the faxmodem 10 to answer the call by issuing an ATA command to the faxmodem and initiating a facsimile handshake, just as if a call had come in from a remote location. The facsimile communication session then takes place with the computer 12, its facsimile software, and the faxmodem 10 acting in conjunction to communicate with the local facsimile machine 16. The communication session is normally terminated as with any typical facsimile transmission, by a message from the sending facsimile machine 16 indicating that there is no more information to be sent. The session can also be terminated in other normal ways, such as loss of transmitting signal or carrier (which would occur if the sending facsimile machine was unplugged in the middle of transmission, for instance, or by other events). The controller could also sense loss of current to the local facsimile machine 16, and then typically hang up and send a +FHNG:3 message indicating the loss of current to the computer 12 and its software. The controller 60 returns the modem 10 to the normal operating mode by sending a high logic Fax_Connect signal to OR gate 58 to de-energize relay 52.

There is a second, less common way that the controller 60 notifies the computer 12 so that the computer will process the incoming information as if a remote facsimile machine had called. Instead of sending Ring messages to the computer 12, the controller 60 may automatically do an initial handshake with the local facsimile machine 16, and then notify the computer of a "fax connect", thereby triggering a facsimile communication session with the computer 12, its facsimile software, and the faxmodem 10 acting in conjunction to communicate with the local facsimile machine 16, as above.

The two different ways of signaling the start of the facsimile session are selected by a command from the computer 12 to the faxmodem 10 some time before the facsimile session. For class 2 faxmodems, the command is typically AT&FSO=1+FCLASS=2 to specify an answer where the initial handshake is controlled by the faxmodem 10; and AT&F+FCLASS=2 to specify an answer where the initial handshake involves interaction between the computer 12, its software, and the faxmodem 10.

It should be recognized that while the example above is shown for class 2 faxmodems, that the approach works for other classes like class 1.

An important attribute of the invention is that facsimile software does not have to be modified in any way to work correctly. From the computer 12 and facsimile software's point of view, the faxmodem 10 behaves in a way identical to, or at least equivalent to, the way the faxmodem 10 behaves when an incoming call occurs from a remote faxmodem. We say "equivalent to" since the faxmodem 10 might separate Ring messages with less time delay than is typical to save time, counting on the fact that most facsimile software will tolerate less-than-typical delays between Ring messages.

After the facsimile machine 16 goes off-hook, if the controller 60 determines that a phone number other than a trigger-scanner number is dialed, relay 52 remains in its de-energized state. Consequently, the connection between the facsimile machine 16 and the central office 20 is maintained to enable the facsimile machine 16 to communicate with the remote device whose telephone number was dialed. Preferably, in this case, the controller 60 will de-energize relay 70 via the Monitor signal. Alternatively, the controller 60 could continue to monitor the telephone call by keeping relay 70 in an energized state. Signals from the facsimile machine 16 will then be routed to both the central office 20 and the datapump 74. The signals can then be passed to the computer 12 if recording is desired.

As described briefly above, the modem 10 of the present invention also performs like a standard modem in that it receives incoming telephone calls from remote devices via the central office 20. A call from a remote device is received at the modem 10 on the CO_TIP and CO_RING lines. The CO_TIP line is connected across optocoupler 82 and its associated circuitry which detect current in the lines from the central office 20. When current is detected, the circuitry generates a CO_Off_Hook signal which is forwarded to the controller 60. The signal is used to monitor when calls from the CO are initiated and terminated. When a ring signal from a remote caller is received, it is routed to the ring detection circuitry 62 which includes an optocoupler 64 for sensing ring current in the line from the central office 20. When the ring is sensed, the optocoupler 64 and its associated circuitry generate a $\overline{\text{Ring\_Detect}}$ signal which is transmitted to the controller 60. For each ring burst, a Ring message is typically sent to the computer 12 as described above. After a preprogrammed number of rings, the computer 12 and its facsimile software command the modem 10 to answer the telephone call.

To answer the call, the controller 60 transmits a logic low Off_Hook signal to OR gate 80. This energizes relay 68 which connects the tip and ring lines across the primary of transformer 66 through relays 68 and 70. The central office 20 detects the modem 10 going off-hook and terminates the ring signal. Next, the computer 12, its facsimile software and the faxmodem 10 typically act in conjunction to initiate the appropriate handshaking routine to establish the link between the modem 10 and the remote caller. After the link is established, appropriate data transfer from the remote caller to the computer 12 can take place via the modem 10. When the transfer is over, the call is terminated as described above. Relay 68 is then de-energized to return the modem 10 to the normal operating mode.

As mentioned above, the facsimile machine 16 also receives incoming telephone calls from the central office 20. It has its own ring detection circuitry and controlling circuitry which enable it to answer the call in accordance with its programming. Like the modem 10, the facsimile machine 16 can be programmed to answer a call after a specific number of rings. As described above, the numbers of rings can be programmed into the modem 10 and the facsimile machine 16 in accordance with functional options desired by the user. Also, when the power of the modem is off, relay 52 is de-energized. The facsimile machine 16 is coupled to the telephone interface 22 and will answer all incoming calls.

The modem 10 of the present invention can also be used to record voice messages. Where the modem 10 is capable of processing voice telephone calls, a local phone can be connected to the local instrument interface 18. The user then dials a trigger-scanner number which is detected by the controller 60. The controller 60 energizes relay 52, and the user dictates the voice message. The message is coupled by the transformer 66 to the datapump 74 which forwards it to the computer 12 through the controller 60 for recording.

A phone can also be plugged into the local instrument interface 18 in parallel with the facsimile machine 16. The telephone will operate normally unless a trigger-scanner number is generated. In that case, the relay 52 will be energized to disconnect the instrument interface 18 from the line interface 22, and the telephone will not function until the call is processed and the modem 10 returns to the normal operating mode.

Figure 3:
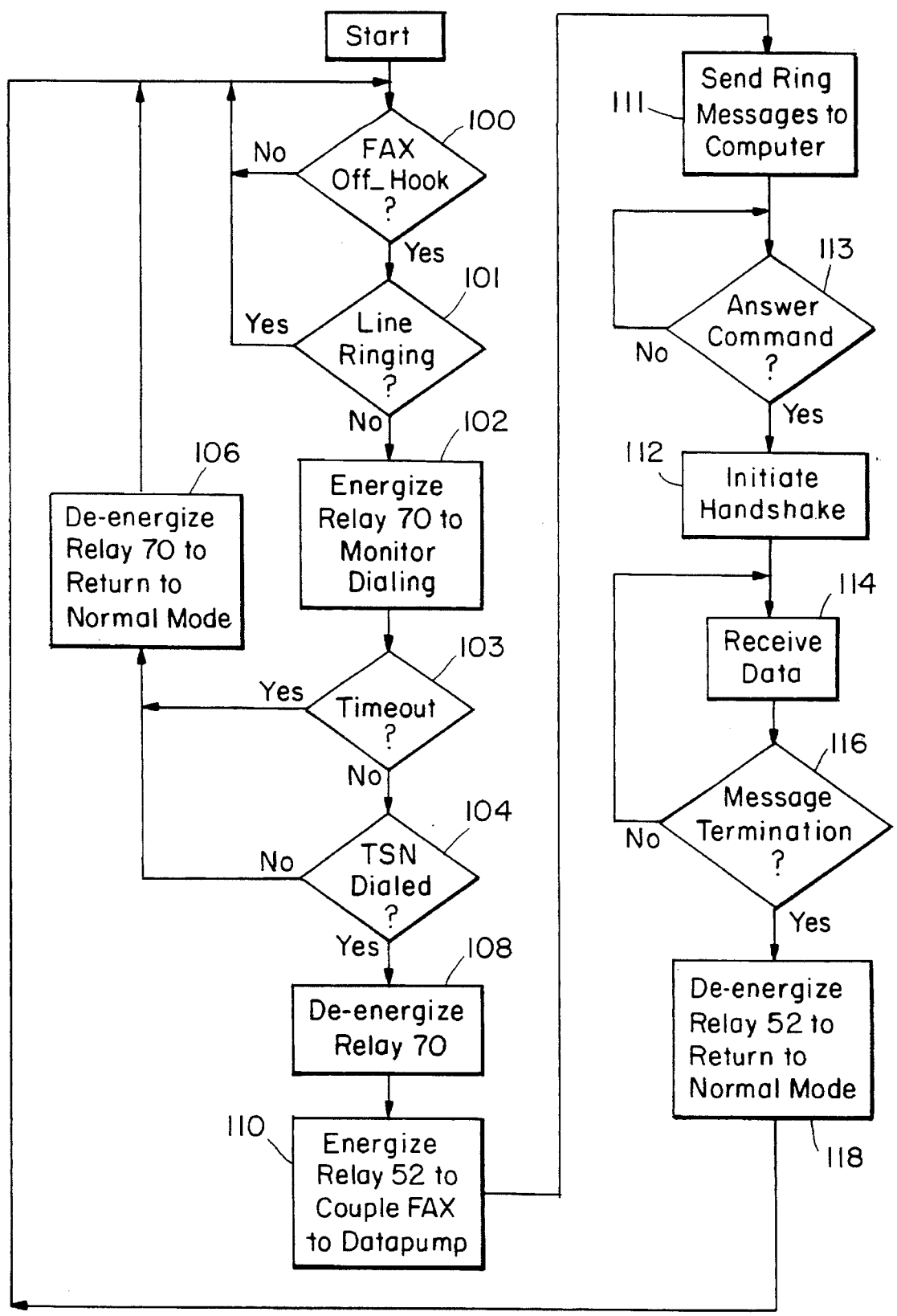
FIGS. 3 contains a flowchart depicting the logical flow of the scanning operation of the modem of the present invention.

FIG. 3 contains a flowchart depicting the logical flow of the scanning operation of the modem 10 of the present invention. In decision box 100, the modem waits for the facsimile machine 16 to go off-hook. When it does so, if the line from the central office is not ringing (step 101), relay 70 is energized at step 102 so that the phone number dialed by the facsimile machine 16 can be monitored. If the line is ringing (step 101), the modem will wait for it to stop or for the facsimile machine to go back on hook. If a pre-set timeout period expires (step 103) before a trigger-scanner number is dialed, or if a number other than a TSN is dialed (step (104), then relay 70 is de-energized at step 106 to return the modem to the normal operating mode and the modem begins waiting again for the facsimile machine to go off hook.

If the phone number dialed is a trigger-scanner number, then the relay 70 is de-energized at step 108, and relay 52 is energized at step 110 to couple the facsimile machine 16 to the datapump 74. Next, if the modem is not programmed to automatically answer the call, it sends Ring messages to the host computer at step 111. At decision box 113, the modem waits to receive an Answer command (ATA) back from the host computer. When the command is received, the appropriate handshaking procedure is initiated at step 112. After the link is established, the modem 10 begins receiving data at step 114. As shown at decision box 116, when termination is reached due to the end of the message, loss of carrier or some other terminating event, relay 52 is de-energized at step 118 to return the modem to the normal mode, and the modem 10 begins waiting once again for the facsimile machine to go off-hook.

While this invention has been particularly shown and described with references to preferred embodiments thereof, it will be understood by those skilled in the art that various changes in form and details may be made therein without departing from the spirit and scope of the invention as defined by the appended claims.

The invention claimed is:

1. A modem for processing data in conjunction with a host computer running facsimile software comprising:

a telephone line interface for coupling an external telephone line to the modem;

a local instrument interface for coupling a facsimile machine to the modem;

a computer interface for coupling the host computer to the modem:

coupling circuitry that couples the telephone line interface to the local instrument interface such that as telephone number digits are dialed by the facsimile machine and transmitted over the local instrument interface to the modem, they are forwarded directly over the telephone line interface to the external telephone line such that an external telephone call is initiated over the external telephone line as the telephone number digits are dialed by the facsimile machine; and processing circuitry coupled to the local instrument interface that also receives the telephone number digits as the telephone number digits are dialed by the facsimile machine and that detects from the dialed digits a telephone number dialed by the facsimile machine, the processing circuitry, upon detection of a trigger telephone number assigned to the host computer, configuring the modem such that data from the facsimile machine associated with the dialed telephone number is transferred over the computer interface such that it can be processed by the host computer running the facsimile software and the processing circuitry, upon detection of a telephone number that is not a trigger telephone number assigned to the host computer, allowing the external telephone call that was initiated by the facsimile machine to be continued without interruption over the external telephone line.

2. The modem of claim 1 wherein, in a normal operating mode, the facsimile machine and the modem are connected to the external telephone line and, upon detection of the trigger telephone number by the processing circuitry, the facsimile machine is disconnected from the external telephone line.

3. The modem of claim 1 wherein the coupling circuitry is switchable such that the facsimile machine can be disconnected from the external telephone line.

4. The modem of claim 1 further comprising a ring detection circuit for detecting a ring signal on the external telephone line.

5. The modem of claim 1 further comprising a facsimile current sense circuitry for sensing current in a line from the facsimile machine.

6. The modem of claim 1 wherein the facsimile software is standard unmodified facsimile software.

7. The modem of claim 1 wherein the processing circuitry receives indications of sensed facsimile current to detect when the facsimile machine is active.

8. The modem of claim 1 further comprising central office battery simulation circuitry for providing a DC current to the facsimile machine.

9. The modem of claim 1 wherein the processing circuitry signals an incoming telephone call to the host computer by sending a Ring message to the host computer.

10. A method of processing data from a facsimile machine with a modem operating in conjunction with a host computer running facsimile software comprising:

coupling the modem to an external telephone line via a telephone line interface in the modem;

coupling the facsimile machine to the modem via a local instrument interface in the modem;

coupling the host computer to the modem via a computer interface in the modem;

coupling the external telephone line interface to the local instrument interface such that, as telephone number digits are dialed by the facsimile machine and transmitted over the local instrument interface to the modem, they are forwarded over the telephone line interface to the external telephone line;

initiating an external telephone call from the facsimile machine, the external telephone call being initiated by the facsimile machine dialing telephone number digits which are transmitted over the local instrument interface to the modem and are forwarded directly over the telephone interface to the external telephone line;

detecting the telephone number digits dialed by the facsimile machine as the telephone number digits are dialed by the facsimile machine to detect a telephone number dialed by the facsimile machine;

upon detection of a trigger telephone number assigned to the host computer dialed by the facsimile machine, configuring the modem to process data from the facsimile machine; and upon detection of a telephone number that is not a trigger phone number assigned to the host computer, allowing the external telephone call that was initiated by the facsimile machine to be continued without interruption over the external telephone line.

11. The modem of claim 10 wherein, in a normal operating mode, the facsimile machine and the modem are connected to the external telephone line and, upon detection of the trigger telephone number, the facsimile machine is disconnected from the external telephone line.

12. The method of claim 10 further comprising the modem detecting a ring single on the external telephone line.

13. The method of claim 10 further comprising sensing current in a line between the facsimile machine and the modem.

14. The method of claim 10 wherein the facsimile software is standard unmodified facsimile software.

15. The method of claim 10 further comprising sensing facsimile machine current to detect when the facsimile machine becomes active.

16. The method of claim 10 further comprising providing a DC current to the facsimile machine via the local instrument interface.

17. The method of claim 10 wherein signalling an incoming telephone call to the host computer comprises sending a Ring message to the host computer.

18. A document handling system comprising:

a host computer;

a facsimile machine for converting documents into digitized data; and a modem coupled to the host computer, the facsimile machine and an external telephone line such that the host computer and the facsimile machine are coupled to the external telephone line, the modem operating in conjunction with the host computer running facsimile software to process incoming telephone calls, the facsimile machine initiating an external telephone call by dialing telephone number digits and transmitting the telephone number digits to the modem, the modem forwarding the telephone number digits over the external telephone line as they are dialed such that the external telephone call is initiated, the modem detecting the telephone number digits dialed by the facsimile machine to detect a telephone number dialed by the facsimile machine, upon detection of a trigger telephone number assigned to the host computer dialed by the facsimile machine, the modem processing digitized document data from the facsimile machine in conjunction with the host computer running the facsimile software and, upon detection of a telephone number that is not a trigger telephone number assigned to the host computer, allowing the external telephone call that was initiated by the facsimile machine to be continued without interruption over the telephone line.

19. The document handling system of claim 18 wherein, in a normal operating modem, the facsimile machine and the modem are connected to the external telephone line and, upon detection of the trigger telephone number by the modem, the facsimile machine is disconnected from the external telephone line.

20. The document handling system of claim 18 wherein the modem comprises coupling circuitry for coupling the facsimile machine to the external telephone line.

21. The document handling system of claim 20 wherein the coupling circuitry is switchable such that the facsimile machine can be disconnected from the external telephone line.

22. The document handling system of claim 18 wherein the modem comprises a ring detection circuit for detecting a ring signal on the external telephone line.

23. The document handling system of claim 18 wherein the modem comprises facsimile current sense circuitry for sensing current in a line from the facsimile machine.

24. The document handling system of claim 18 wherein the facsimile software is standard unmodified facsimile software.

25. The document handling system of claim 18 wherein the modem detects the facsimile machine becoming active by sensing current in a line from the facsimile machine.

26. A modem comprising:

a telephone line interface for coupling a host computer to an external telephone line;

a local instrument interface for coupling a facsimile machine to the modem;

ring detection circuitry for detecting a ring signal from an incoming call on the external telephone line;

coupling circuitry that couples the telephone line interface to the local instrument interface, the facsimile machine and the modem being connected to the external telephone line in a normal operating mode of the modem such that ring signals of incoming telephone calls are detected by the facsimile machine and the ring detection circuitry, and incoming telephone calls can be processed by either of the facsimile machine and modem and telephone number digits dialed by the facsimile machine and transmitted over the local instrument interface are forwarded directly over the telephone line interface to the external telephone line as the digits are dialed by the facsimile machine such that an external telephone call is initiated by the facsimile machine; and processing circuitry coupled to the local instrument interface that detects telephone number digits dialed by the facsimile machine and transmitted over the local instrument interface as the digits are dialed by the facsimile machine and that detects from the digits a telephone number dialed by the facsimile machine to initiate the external telephone call and, upon detection of a trigger telephone number assigned to the host computer, that configures the modem to process data from the facsimile machine and, upon detection of a telephone number that is not a trigger telephone number assigned to the host computer, that allows the external telephone call to be continued without interruption over the external telephone line.

27. A modem comprising:

a computer interface over which the modem and a host computer can communicate;

a local instrument interface over which the modem and a local instrument device can communicate;

a telephone line interface for coupling the modem to an external telephone line such that the modem and remote devices can communicate over the external telephone line via a telephone company central office;

coupling circuitry that couples the computer interface, the local instrument interface and the telephone line interface, the coupling circuitry, in a normal operating mode of the modem, connecting both the host computer and the local instrument to the external telephone line such that telephone number digits dialed by the local instrument and transmitted over the local, instrument interface are forwarded over the external telephone line interface to the telephone line as the digits are generated by the local instrument such that an external telephone call is initiated by the local instrument; and processing circuitry coupled to the interfaces and the coupling circuitry that detects telephone number digits dialed by the local instrument as the digits are dialed by the local instrument and that detects a telephone number dialed by the local instrument to initiate the external telephone call, the processing circuitry, upon detection of a trigger telephone number assigned to the host computer dialed by the local instrument, commanding the coupling circuitry to configure the modem to process data from the local instrument and, upon detection of a telephone number that is not a trigger telephone number assigned to the host computer, allowing the external telephone call to be continued without interruption over the telephone line.

28. A modem for processing data in conjunction with a host computer running facsimile software comprising:

a telephone line interface for coupling an external telephone line to the mode;

a local instrument interface for coupling a facsimile machine to the modem;

a computer interface for coupling the host computer to the modem;

coupling circuitry that couples the telephone line interface to the local instrument interface such that, as rotary-dialed telephone number digits are dialed by the facsimile machine and transmitted over the local instrument interface to the modem, they are forwarded directly over the telephone line interface to the external telephone line such that an external telephone call is initiated over the external telephone line as the telephone number digits are dialed by the facsimile machine; and processing circuitry coupled to the local instrument interface that receives indications of sensed facsimile current and times them to detect a rotary-dialed telephone number dialed by the facsimile machine, the processing circuitry, upon detection of a trigger telephone number assigned to the host computer, configuring the modem such that data from the facsimile machine associated with the rotary-dialed telephone number is transferred over the computer interface such that it can be processed by the host computer running the facsimile software and, upon detection of a telephone number that is not a trigger telephone number assigned to the host computer, allowing the external telephone call that was initiated by the facsimile machine to be continued without interruption over the external telephone line.

29. A method of processing a message from a facsimile machine with a modem operating in conjunction with a host computer running facsimile software comprising:

coupling the modem to an external telephone line via a telephone line interface in the modem;

coupling the facsimile machine to the modem via a local instrument interface in the modem;

coupling the host computer to the modem via a computer interface in the modem;

coupling the external telephone line interface to the local instrument interface such that, as rotary-dialed telephone number digits are dialed by the facsimile machine and transmitted over the local instrument interface to the modem, they are forwarded over the telephone line interface to the external telephone line;

initiating an external telephone call from the facsimile machine, the external telephone call being initiated by the facsimile machine dialing rotary-dialed telephone number digits which are over the local instrument interface to the modem and are forwarded directly over the telephone interface to the external telephone line;

sensing and timing facsimile machine current to detect the rotary-dialed telephone number digits dialed by the facsimile machine as the telephone number digits are dialed by the facsimile machine to detect from the digits a telephone number dialed by the facsimile machine;

upon detection of a trigger telephone number assigned to the host computer dialed by the facsimile machine, configuring the modem to process data from the facsimile machine; and upon detection of a telephone number that is not a trigger telephone number assigned to the host computer, allowing the external telephone call that was initiated by the facsimile machine to be continued without interruption over the external telephone line.

30. A document handling system comprising:

a host computer;

a facsimile machine for converting documents into digitized data; and a modem coupled to the host computer, the facsimile machine and an external telephone line such that the host computer and the facsimile machine are coupled to the external telephone line, the modem operating in conjunction with the host computer running facsimile software to process incoming telephone calls, the facsimile machine initiating an external telephone call by dialing rotary-dialed telephone number digits and transmitting the telephone number digits to the modem, the modem forwarding the telephone number digits over the external telephone line as they are dialed such that the external telephone call is initiated, the modem being adapted to sense current in a line from the facsimile machine to detect the rotary dialed telephone number digits dialed by the facsimile machine and forwarding the digits over the telephone line as the digits are dialed and detecting from the digits a telephone number dialed by the facsimile machine and being configurable upon detection of a trigger telephone number assigned to the host computer dialed by the facsimile machine to process digitized document data from the facsimile machine in conjunction with the host computer running the facsimile software and, upon detection of a telephone number that is not a trigger telephone number assigned to the host computer, allowing the external telephone call that was initiated by the facsimile machine to be continued without interruption over the telephone line.

31. A modem for processing data in conjunction with a host computer running standard unmodified facsimile software comprising:

a telephone line interface for coupling an external telephone line to the modem;

a local instrument interface for coupling a facsimile machine to the modem;

a computer interface for coupling the host computer to the modem;

coupling circuitry that couples the telephone line interface to the local instrument interface such that, as telephone number digits are dialed by the facsimile machine and transmitted over the local instrument interface to the modem, they are forwarded directly over the telephone line interface to the external telephone line such that an external telephone call is initiated over the external telephone line as the telephone number digits are dialed by the facsimile machine; and processing circuitry coupled to the local instrument interface that also receives the telephone number digits as the telephone number digits are dialed by the facsimile machine and that detects from the dialed digits a telephone number dialed by the facsimile machine, the processing circuitry, upon detection of a trigger telephone number assigned to the host computer, configuring the modem such that data from the facsimile machine associated with the dialed telephone number is transferred over the computer interface such that is can be processed by the host computer running the standard unmodified facsimile software and, upon detection of a telephone number that is not a trigger telephone number assigned to the host computer, allowing the external telephone call that was initiated by the facsimile machine to be continued without interruption over the external telephone line.

* * * * *

UNITED STATES PATENT AND TRADEMARK OFFICE
CERTIFICATE OF CORRECTION

PATENT NO. : 5,528,385
DATED : June 18, 1996
INVENTOR(S) : Frank B. Manning

It is certified that error appears in the above-indentified patent and that said Letters Patent is hereby corrected as shown below:

In claim 1, column 9, line 23, change ":" to ";", at line 25, after "such that " insert ---,---, and at line 36 change "arc" to ---are---.

In claim 5, column 9, line 63, after "comprising" delete "a".

In claim 12, column 10, line 51, change "single" to ---signal---.

In claim 27, column 12, line 38, after "local," delete the comma.

In claim 28, column 12, line 60, change "mode" to ---modem---.

In claim 29, column 13, line 43, after "are," insert ---transmitted---.

Signed and Sealed this

Fifteenth Day of October, 1996

Attest:

BRUCE LEHMAN

*Attesting Officer*    *Commissioner of Patents and Trademarks*